United States Patent [19]

Finn et al.

[11] Patent Number: 4,781,364
[45] Date of Patent: Nov. 1, 1988

[54] ELASTIC BEAM-TORSION ROD CONNECTION

[75] Inventors: Bernard J. Finn, Troy; Ming-Chih Yew, Rochester, both of Mich.

[73] Assignee: General Motors Corporation, Detroit, Mich.

[21] Appl. No.: 541,862

[22] Filed: Oct. 14, 1983

[51] Int. Cl.$^4$ .......................... F16F 1/18; F16F 1/14; B60G 19/00
[52] U.S. Cl. .................... 267/260; 267/273; 267/279; 280/689
[58] Field of Search ............ 267/54 R, 25, 56, 57.1 A, 267/47, 48, 148, 149, 158, 45, 260, 264, 273, 154, 279; 280/719, 700, 689, 721; 403/362

[56] References Cited

U.S. PATENT DOCUMENTS

| | | | |
|---|---|---|---|
| 1,661,530 | 3/1928 | Field | 267/54 R |
| 1,892,668 | 1/1933 | Heiney | 267/54 R |
| 2,762,668 | 9/1956 | Van Raden | 267/54 R |
| 3,831,966 | 8/1974 | Grosseau | 267/57.1 A X |
| 4,475,723 | 10/1984 | Meyer | 267/47 |

FOREIGN PATENT DOCUMENTS

| | | | |
|---|---|---|---|
| 0586480 | 3/1925 | France | 267/45 |
| 0253063 | 9/1926 | United Kingdom | 267/53 |

Primary Examiner—Duane A. Reger
Assistant Examiner—Robert J. Oberleitner
Attorney, Agent, or Firm—Saul Schwartz

[57] ABSTRACT

A twist isolating connection between a distal end of an elastic beam disposed transversely of a vehicle sprung mass and an adjacent end of a torsion rod disposed longitudinally of the sprung mass between a suspension control arm and the elastic beam distal end, the connection including a yoke rigidly attached to the end of the torsion rod with a pair of legs straddling a platform member on the distal end of the elastic beam, and a pair of protuberances on the legs engaging opposite sides of the platform member in a common transverse plane of the sprung mass but at laterally spaced locations. The elastic beam is thus clamped between the protuberances which transfer torsional moments to the elastic beam for resistance in bending modes but which isolate the elastic beam from the torsion rod with respect to twisting of the beam due to beam bending of the torsion rod.

4 Claims, 2 Drawing Sheets

ELASTIC BEAM-TORSION ROD CONNECTION

BACKGROUND OF THE INVENTION

Field of the Invention

This invention relates generally to vehicle suspension systems combining elastic beams and torsion rods and, more particularly, to a twist isolating connection between the torsion rods and the elastic beam.

In a vehicle suspension system recently proposed by Finn and Yew, U.S. Ser. No. 516,034, filed July 22, 1983 now U.S. Pat. No. 4,540,197 and assigned to the assignee of this invention, a primary suspension elastic beam is disposed transversely of the vehicle body for bending about a pair of laterally spaced nodal points which remain stationary relative to the body. A pair of longitudinally extending torsion rods each have one end connected to a corresponding one of a pair of lower suspension control arms outboard of the pivot axes of the arms so that during jounce and rebound deflection of the control arms the torsion rods are bodily displaced in arcs about the control arm pivot axes. The elastic beam is constructed such that the ends of the beam laterally outboard of the stationary nodal points traverse arcs which approximate the arcs traversed by the arcs through the torsion rods. Accordingly, the free ends of the torsion rods are rigidly connected to the distal ends of the elastic beam so that torsional moments on the torsion rods developed by the weight of the vehicle and by suspension excursions of the control arms are resisted in beam bending by the elastic beam. While the system is inherently balanced during equal excursions of the control arms in opposite directions, unequal excursions which occur, for example, during cornering impose unbalanced forces on the system which require another pair of attachment points either between the body and the elastic beam at the nodal points or between the torsion rods and the control arms intermediate the ends of the torsion rods. In either case, but especially the second, the torsion rods may themselves experience beam bending which can twist the elastic beam about its longitudinal axis. Because elastic beams intended for operation in beam bending modes are not usually adapted for simultaneous twist about a longitudinal axis, it is desirable to isolate the elastic beam from the torsion rods with respect to such twist. A twist isolating connection according to this invention effects the desired isolation.

SUMMARY OF THE INVENTION

Accordingly, the primary feature of this invention is that it provides a new and improved connection between a transversely oriented primary suspension elastic beam of a vehicle and a longitudinally oriented torsion rod whereby the elastic beam is isolated from the torsion rod with respect to bending of the torsion rod so that twisting of the elastic beam about its longitudinal axis is avoided. Another feature of this invention resides in the provision in the new and improved connection of means for adjusting the relative orientation of the torsion rod and the elastic beam to vary the design or curb height of the vehicle. Still another feature of this invention resides in the provision in the new and improved connection of a yoke on the end of each torsion rod having upper and lower legs straddling the corresponding distal end of the elastic beam and in the provision of protuberances on the legs of the yoke operative to engage upper and lower surfaces of the end of the elastic beam in a common transverse plane of the vehicle but at a point on the upper surface which is laterally spaced relative to the contact point on the lower surface so that a force couple is applied to the elastic beam in bending modes but not in twisting modes. And a still further feature of this invention resides in the provision in the new and improved connection of a protuberance in the form of a hemispherical end on a bolt threaded on the upper leg of the yoke and engageable on the upper surface of the elastic beam, the bolt being rotatable to adjust the spacing between the upper leg and the elastic beam to adjust the design height of the vehicle.

These and other features of this invention will be readily apparent from the following specification and from the drawings wherein.

Figure 1:
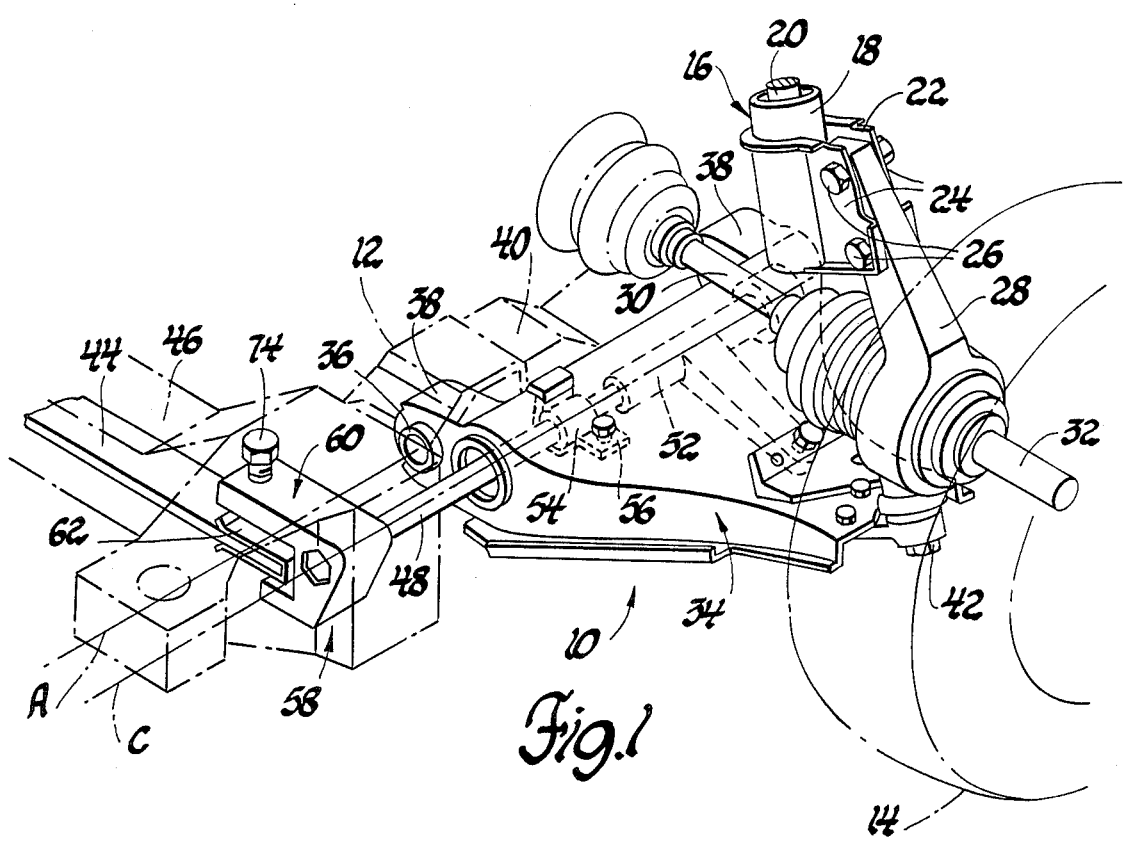
FIG. 1 is a fragmentary perspective view, partially in phantom, of a vehicle suspension system including a twist isolating connection according to this invention.
Figure 2:
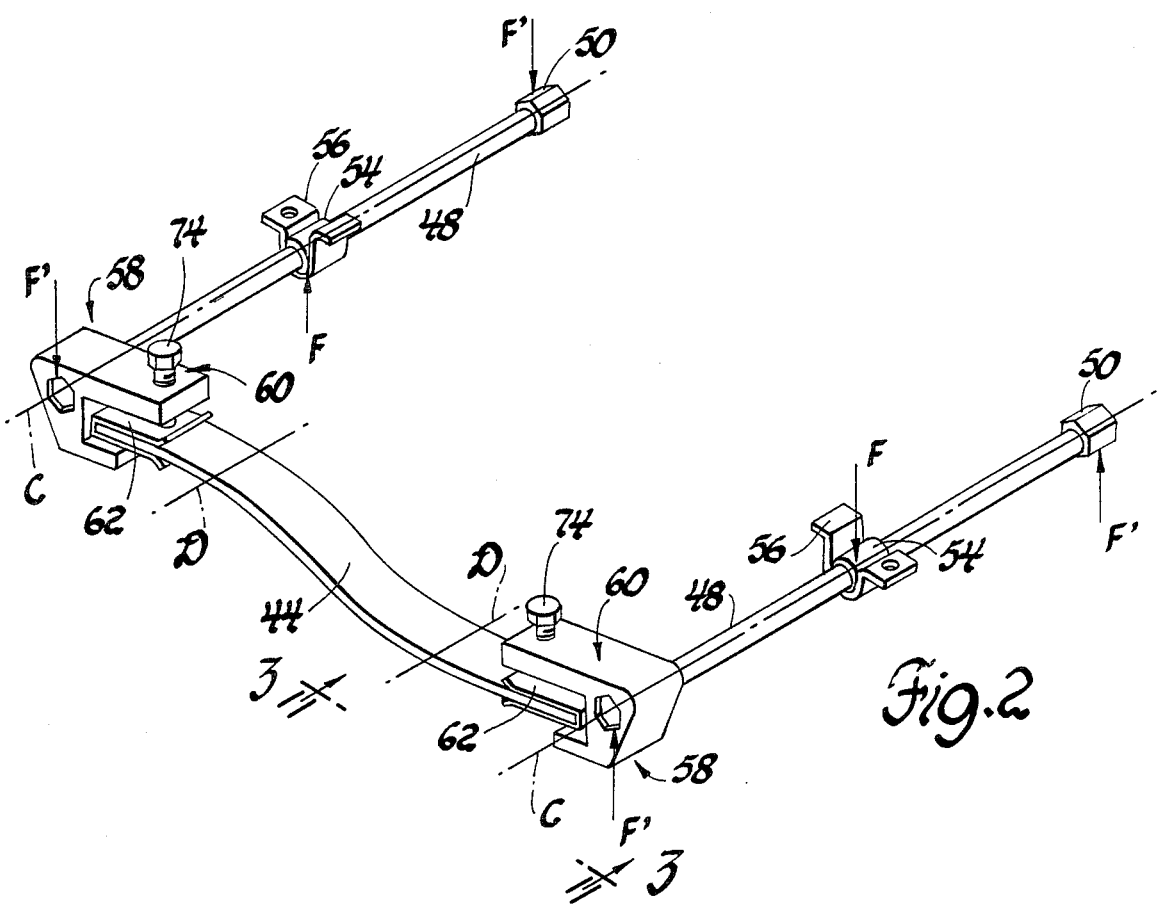
FIG. 2 is a perspective view showing a portion of the suspension system including the elastic beam, torsion rods, reaction mounts and the twist isolating connections according to this invention between the elastic beam and the torsion rods.

Referring now to FIGS. 1 and 2 of the drawings, the left front portion of an automobile suspension system susbstantially as disclosed in the aforementioned Finn and Yew patent application Ser. No. 516,034 is designated generally 10 and is adapted to resiliently support a vehicle chassis sprung mass 12 on a steerable front wheel 14. The suspension system left front portion 10 has a mirror image counterpart on the laterally opposite side of the vehicle. The suspension system left front portion 10 includes a vertical strut/shock 16 having an outer shock cylinder 18 and a telescoping piston rod 20 suitably anchored to an upper sheet metal tower structure, not shown, of the vehicle sprung mass by a conventional coupling. The strut/shock 16 further includes a saddle bracket 22 welded or otherwise fixed to the cylinder 18 with a pair of ears 24 adapted for reception of a spaced pair of through bolt and nut assemblies 26 which attach the strut/shock to an upper portion of a steering knuckle 28. The knuckle 28 includes provision for the passage therethrough of a drive shaft 30 connected to a live spindle 32 rotatably supported on the knuckle. The wheel 14 is attached to the live spindle and is therefore driven by the drive shaft 30. The drive shaft 30 is adapted at its inboard end for connection to a front mounted engine transmission unit, not shown, conventionally supported on the sprung mass 12 of the vehicle.

The suspension system left front portion 10 further includes a transverse control arm 34 defining part of the vehicle sprung mass and mounted to swing about an axis A of the vehicle by an aligned pair of pivot assemblies including a pair of rubber bushed sleeves, only a single sleeve 36 being shown in FIG. 1, seated in a pair of spaced legs 38 of the control arm and affixed to corresponding brackets supported on a longitudinal rail 40 of the sprung mass. At the outboard end of the control arm, there is provided a conventional ball joint 42 installed within a lower portion of the steering knuckle 28. The ball joint cooperates with the strut/shock 16 to define a steer axis for the steerable wheel 14 under actuation of conventional steering linkage, not shown.

With continued reference to FIGS. 1 and 2, a transverse planar elastic beam 44 is disposed within the confines of a front box section cross member 46 of the sprung mass 12 or other suitable clearance space and is common to both left and right front suspension portions. The elastic beam 44 extends completely across the vehicle in symmetrical fashion with respect to the longitudinal center line thereof. Preferably, the elastic beam is constructed of reinforced polymeric material such as a fiberglass reinforced polyester resin whereby the elastic beam achieves light weight, absorbs high amounts of strain energy, and exhibits a modulus of elasticity well adapted for both ride and vehicle roll rate control. As taught by the aforementioned Finn and Yew patent application Ser. No. 516,034 the elastic beam flexes in pure bending about a pair of laterally spaced nodal points located on a pair of longitudinal axes D, FIG. 2, which remain fixed relative to the sprung mass 12. The distal ends of the elastic beam 44, effectively pivoting about respective ones of the nodal points, traverse arcs in a transverse plane containing the longitudinal axis of the elastic beam which approximate the arcs traversed by points on the control arms longitudinally aligned with the ends of the beam on a pair of axes C. A pair of torsion rods 48 are aligned on respective ones of the axes C outboard of control arm pivot axes A. Each torsion rod has a rearward end 50 rigidly attached to a corresponding one of the control arms, only an adjustable attaching socket 52 between the control arm 34 and the left side torsion rod 48 being shown in FIG. 1. A pair of bushings 54 disposed on respective ones of the torsion rods 48 intermediate their ends are received in corresponding ones of a pair of brackets 56 rigidly attached to the control arms. The forward ends of the torsion rods 48 are attached to the adjacent distal ends of the elastic beam 44 through respective ones of a pair of twist isolating connections according to this invention and designated 58.

Figure 3:
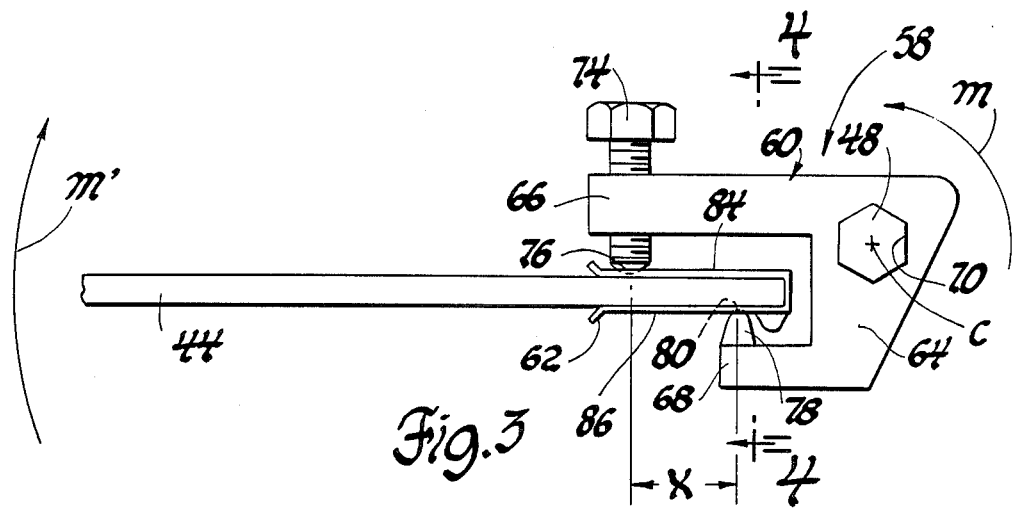
FIG. 3 is a view taken generally along the plane indicated by lines 3—3 in FIG. 2.
Figure 4:
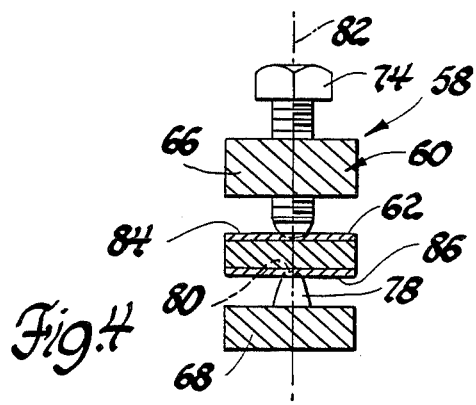
FIG. 4 is a sectional view taken generally along the plane indicated by lines 4—4 in FIG. 3.
Figure 5:
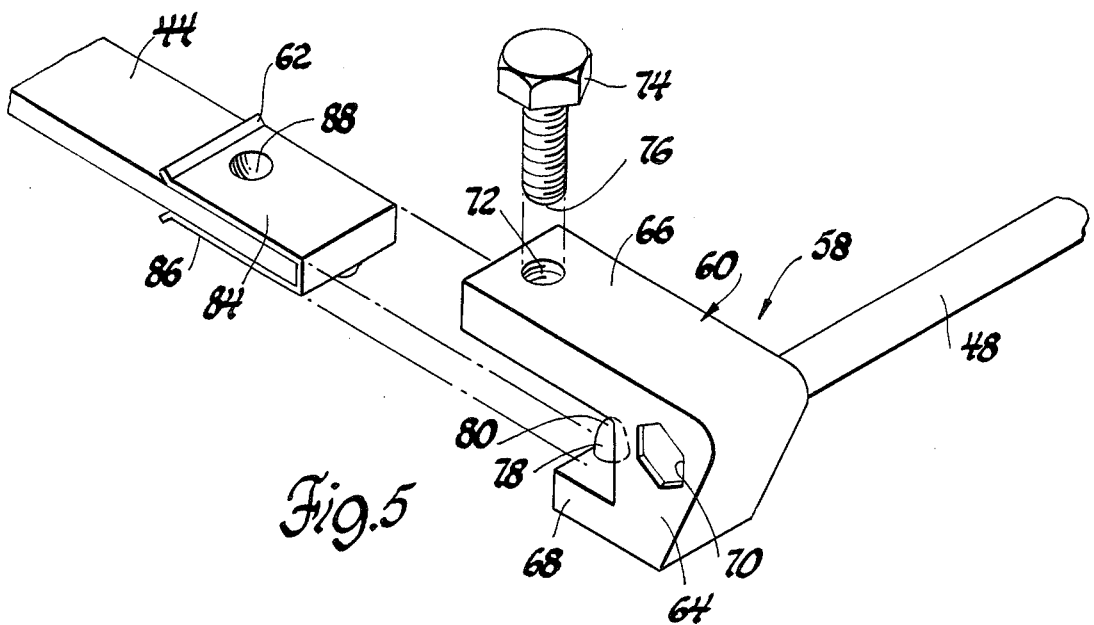
FIG. 5 is an exploded perspective view of the twist isolating connection according to this invention.

Referring now to FIGS. 3 through 5 and describing the twist isolating connections 58 with specific reference to the one associated with the suspension system left front portion 10, the connection includes a yoke 60 and a platform member 62. The yoke 60 has a body portion 64 and a pair of integral spaced legs 66 and 68. The body portion 64 has a bore 70 therethrough adapted to receive the forward or front end of the torsion rod 48. The bore 70 is noncircular in cross section to receive the correspondingly formed end of the torsion rod in a manner foreclosing relative rotation between the yoke and the torsion rod. Alternatively, of course, the bore 70 may be splined to receive corresponding splines on the torsion rod. The upper leg 66 has a threaded aperture 72 therethrough, FIG. 5, which receives a bolt 74 having a generally hemispherical end 76. The lower leg 68 of the yoke has an integral raised protuberance 78 defining a generally hemispherical end 80. As seen best in FIG. 3, the bolt 74 is laterally offset inward relative to the protuberance 78 by a distance designated X. As best seen in FIG. 4, both the bolt 74 and the protuberance 78 are disposed in a common transverse plane 82 perpendicular to the axis of the torsion rod 48.

With continued reference to FIGS. 3 through 5, the platform member 62 is a U-shaped clip enveloping the distal end of the elastic beam 44 and defining an upper surface 84 and a lower surface 86. The upper surface 84 has a generally hemispherical indentation 88 therein, FIG. 5, to match the hemispherical end 76 of the bolt 74. The lower surface 86 includes a similar indentation, not shown, to match the hemispherical end 80 of the protuberance 78. The indentations are centered between the front and rear edges of the beam in a common plane perpendicular to the surfaces 84 and 86 which plane coincides with the plane 82 when the yoke and platform member are assembled. The yoke and platform members are assembled by inserting the end of elastic beam 44 and the platform member 62 between the legs 66 and 68 of the yoke such that upper surface 84 is juxtaposed the upper leg 66 and lower surface 86 is juxtaposed lower leg 68. In addition, when the yoke and platform members are assembled the hemispherical end 76 of bolt 74 projects into indentation 88 in the upper surface while the hemispherical end 80 of the protuberance 78 projects into the corresponding indentation in the lower surface 86. It will, of course, be apparent that the distal end of the elastic beam may have indentations corresponding to the indentations in the platform member so that the platform member can be the distal end of the elastic beam itself. Accordingly, the protuberance 78 and the bolt 74 cooperate to clamp the platform member between the legs of the yoke while simultaneously spanning a lateral section of the elastic beam having a length equal to the dimension X.

In operation, the elastic beam 44 is designed to function as described in the aforementioned patent application of Finn and Yew, Ser. No. 516,034 as the primary suspension spring of the suspension system. In particular, the nodal points of the elastic beam at axes D are stationary relative to the sprung mass 12 regardless of whether the beam is deflected in simple pure bending corresponding to equal deflections of the road wheels relative to the sprung mass or in higher order sinuous curvatures corresponding to unequal deflections as occurs, for example, in cornering. The platform members 62 on the distal ends of the elastic beam traverse arcs in a transverse plane which approximate the arcs traversed by the torsion rods attached to control arms at the sockets represented by socket 52 on the control arm 34, FIG. 1. With the rearward ends 50 of the torsion rods nonrotatably attached to the control arms, as through socket 52, and forward ends nonrotatably connected to yokes 60, the static weight of the sprung mass which rotates the control arms in opposite directions about their pivot axes develops force couples on the torsion rods tending to rotate or twist them in corresponding directions. On the left side, for example, as seen in FIGS. 3 through 5, rotation of the yoke 60 is resisted at the laterally spaced contact points between hemispherical ends 76 and 80 and the platform member upper and lower surfaces 66 and 68, respectively. Because of the lateral spacing of the contact points, the elastic beam is flexed in simple or pure bending until a counter moment designated M', FIG. 3, is developed in the beam. When the counter moment M' equals the static moment M the design or curb height of the vehicle on the left side is achieved. Because of the mirror image relation of right and left sides, a corresponding condition is achieved at the opposite end of the elastic beam and the vehicle rests in a level attitude. In this static condition, no vertical reaction forces are developed between the sprung mass and either one of the elastic beam and the torsion rods.

Different conditions obtain, however, when the road wheels experience unequal deflections. Then, the force couples exerted by the yokes 60 on the elastic beam deflect the beam in higher order sinuous curvatures so that a pair of vertical reaction forces F between the control arms and the torsion rods develop at the bushings 54 to maintain static equilibrium. The forces F acting intermediate the ends of the torsion rods are balanced by oppositely directed forces F' at the forward and rearward ends of the torsion rods which forces place the rods in simple beam bending. At the elastic beam, such bending of the torsion rod can twist the beam about its longitudinal axis.

The connections 58 according to this invention, however, avoid attachment of the forward ends of the torsion rods to the distal ends of the elastic beam across the full width of the beam. Rather, the only points of contact between the yokes 60 at the hemispherical bolt ends 76 and the hemispherical protuberance ends 80 and the platform member 62 lie in the common transverse plane 82 so that no lever arm exists through which a twisting force couple can develop on the beam. Accordingly the elastic beam offers no resistance to beam bending of the torsion rods so that no twisting of the elastic beam occurs.

The embodiments of the invention in which an exclusive property or privilege is claimed are defined as follows:

1. A twist isolating connection between a distal end of a primary suspension elastic beam disposed transversely of a vehicle sprung mass and a torsion rod disposed longitudinally of said sprung mass between a control arm of the latter and said elastic beam distal end, comprising, means on one of said elastic beam distal end and an adjacent end of said torsion rod defining a yoke having a pair of spaced legs, means on the other of said elastic beam distal end and said torsion rod adjacent end defining a platform member between said legs having a first surface juxtaposed a first of said legs and a second surface juxtaposed a second of said legs, means on one of said first surface and said first leg defining a first protuberance contacting the other of said first surface and said first leg in a transverse plane of said sprung mass, and means on one of said second surface and said second leg defining a second protuberance contacting the other of said second surface and said second leg in said transverse plane, said first and said second protuberance being operative to clamp said platform member between said yoke legs only in said transverse plane while spanning a lateral section of said elastic beam so that said elastic beam is isolated from twisting forces resulting from beam bending of said torsion rod but is operative to resist torsional moments on said torsion rod in a beam bending mode.

2. A twist isolating connection between a distal end of a primary suspension elastic beam disposed transversely of a vehicle sprung mass and a torsion rod disposed longitudinally of said sprung mass between a control arm of the latter and said elastic beam distal end, comprising, means on one of said elastic beam distal end and an adjacent end of said torsion rod defining a yoke having a pair of spaced legs, means on the other of said elastic beam distal end and said torsion rod adjacent end defining a platform member between said legs having a first surface juxtaposed a first of said legs and a second surface juxtaposed a second of said legs, first protuberance means between said first surface and said first leg defining a first point of contact therebetween in a transverse plane of said sprung mass at a first lateral distance from the center thereof, and second protuberance means between said second surface and said second leg defining a second point of contact therebetween in said transverse plane and at a second lateral distance from the center of said sprung mass different from said first lateral distance, said first and said second protuberance means being operative to clamp said platform member between said yoke legs only in said transverse plane while spanning a lateral section of said elastic beam so that said elastic beam is isolated from twisting forces resulting from beam bending of said torsion rod but is operative to resist torsional moments on said torsion rod in a beam bending mode.

3. A twist isolating connection as recited in claim 2 wherein one of said first and said second protuberance means includes adjustment means for varying the spacing between corresponding ones of said first leg and said first surface and said second leg and said second surface thereby to adjust the standing height of said sprung mass.

4. A twist isolating connection between a planar reinforced polymeric primary suspension elastic beam disposed transversely of a vehicle sprung mass and a torsion rod disposed longitudinally of said sprung mass between a control arm of the latter and a distal end of said elastic beam comprising, a yoke rigidly attached to an end of said torsion rod adjacent said elastic beam distal end including a first leg and a second leg spaced from said first leg, said elastic beam distal end being received between said first and said second legs, a platform member disposed on said elastic beam distal end defining a first surface juxtaposed said first leg and a second surface juxtaposed said second leg, means defining a first indentation in said first surface in a transverse plane of said sprung mass at a first lateral distance from the center thereof, means defining a first protuberance on said first leg received in said first indentation to effect point contact on said first surface in said transverse plane at said first lateral distance, means defining a second indentation in said second surface in said transverse plane at a second lateral distance from the center of said sprung mass less than said first lateral distance, and fastener means threadedly received on said yoke second leg with an end received in said second indentation to effect point contact on said second surface in said lateral plane at said second lateral distance, said first protuberance and said fastener means being operative to clamp said platform member between said yoke legs and in said transverse plane while spanning a lateral section of said elastic beam so that said elastic beam is isolated from twisting forces resulting from beam bending of said torsion rod but is operative to resist torsional moments on said torsion rod in a beam bending mode, and said fastener means being rotatable relative to said yoke second leg to vary the spacing between said second leg and said platform member second surface thereby to adjust the design height of said sprung mass.

* * * * *